Dec. 26, 1939.  P. ZALKIND  2,184,829
REENTRANT CLIP
Filed Oct. 19, 1935  2 Sheets-Sheet 1
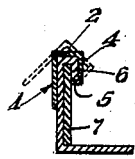
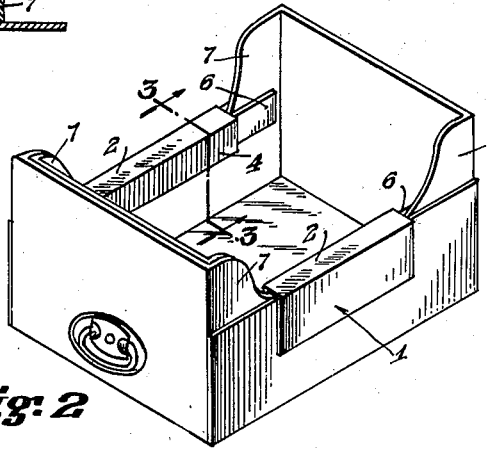
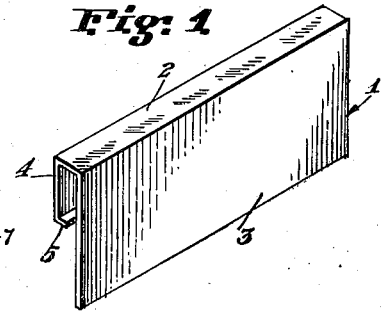
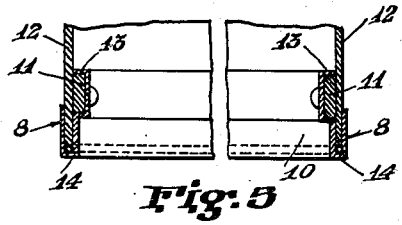
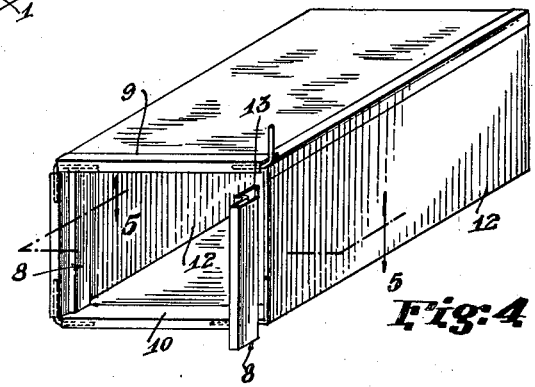
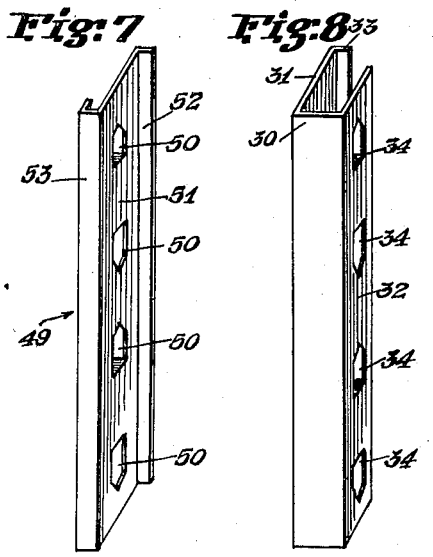
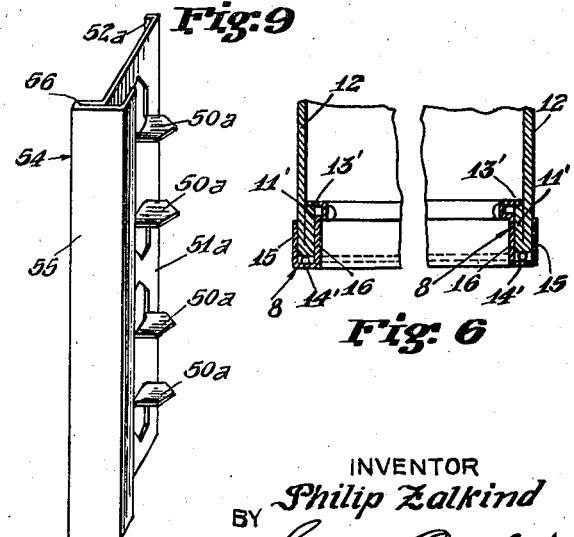
INVENTOR
Philip Zalkind
BY
Samuel Ostrolenk
ATTORNEY Dec. 26, 1939.                P. ZALKIND                2,184,829
                             REENTRANT CLIP
                          Filed Oct. 19, 1935            2 Sheets-Sheet 2
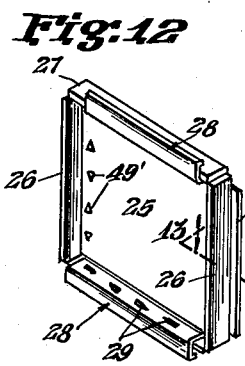
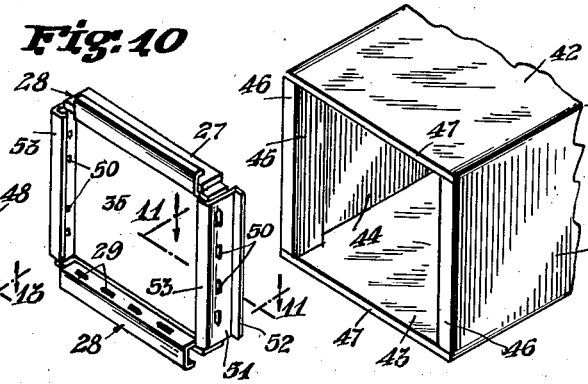
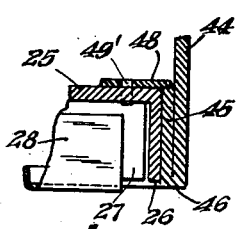
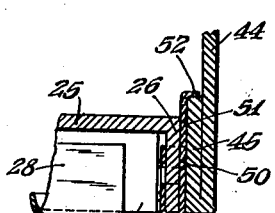
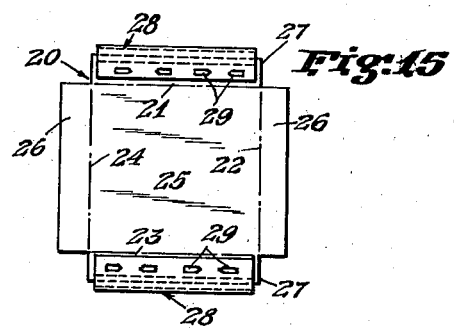
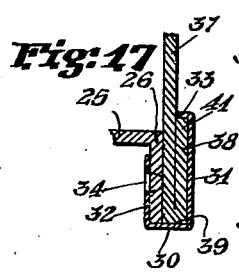
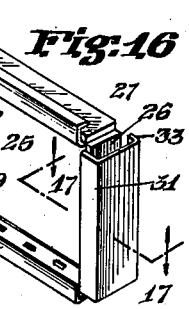
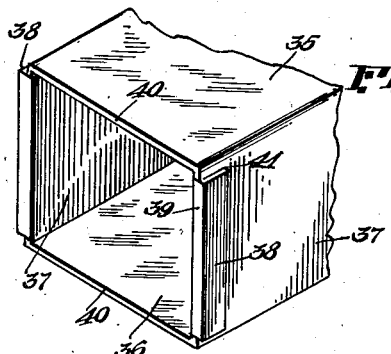
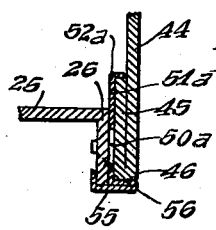
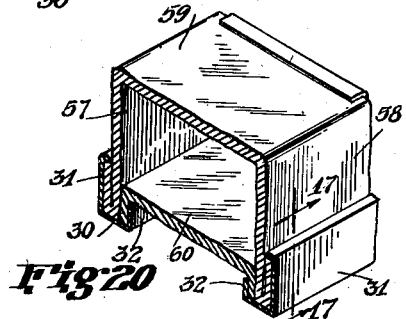
INVENTOR
BY *Philip Zalkind*
ATTORNEY Patented Dec. 26, 1939

2,184,829

UNITED STATES PATENT OFFICE 2,184,829

REENTRANT CLIP

Philip Zalkind, New York, N. Y.

Application October 19, 1935, Serial No. 45,709

9 Claims. (Cl. 229—48)

My invention relates to fastening means adapted for use with collapsible or foldable structures of fibrous sheet material and to certain forms of construction using fibrous sheet material to which my fastening means is particularly adapted.

In structures of the class mentioned, it is frequently desirable to use a securing means that is quickly and easily assembled without tools or other equipment by the consumer or user of the structure, the structure being delivered to the user in knock-down condition for ease in handling and shipping.

In my application Serial No. 631,682 filed September 3, 1932, and in the division thereof, application Serial No. 692,937 filed October 10, 1933, of which applications, this application is a continuation in part, I disclose a U shaped clip having a short flange extending from one of the legs of the U, for use as a vertical reinforcing member for the open end of a file case, and in slightly modified shape for use as retaining means on the side of a filing drawer.

In the use of this clip, a short flap is made on the fibrous sheet material. This flap is bent back upon material to lie flat against the sheet; and the clip which is of metal having elasticity is forced over the flap until the short flange springs back of the edge of the folded back flap. In the construction the folded back flap is held in place against the sheet material without the necessity of using either glue, rivets, or similar fastening means. Thus when the flange on the clip springs into place back of the turned in flap, it is held effectively in place against withdrawal.

The principle involved in the above mentioned application may be used generally for attaching reinforcements or other parts to structures of sheet fibrous materials and for joining adjacent panels in such structures. It may thus be used in file cases, file drawers, cabinets, and other casings and structures. Moreover it is cheap, simple and effective, and it is very easily applied.

The objects of my invention then are to provide a cheap and simple securing means for use with fibrous sheet materials and novel structural forms of fibrous sheet material in conjunction with the securing means. These and other objects of my invention will be apparent from the specification.

My invention is best understood in connection with the following drawings which form a part of the specification. In these drawings, Figure 1 is a perspective view of a form of clip suitable for use in holding together the various parts of a folding file drawer.

Figure 2 is a perspective view of a file drawer in which the clip of Figure 1 is used for holding together the side walls and the front and rear wall flaps.

Figure 3 is a cross section on plane 3—3 of Figure 2, with the method of attaching the clip shown dotted line.

Figure 4 is a perspective view of a casing in which the upright posts as well as the upper and lower stiffening strips are clips adapted to capture and slip over the edge of the material.

Figure 5 is a sectional view on plane 5—5 of Figure 4.

Figure 6 is a view similar to Figure 5 showing a modified construction.

Figures 7, 8, and 9 are perspective views of modified forms of clip.

Figure 10 is a perspective view of panel suitable for closing one end of a casing and to which is applied the clip shown in Figure 7.

Figure 11 is a sectional view on the plane 11—11 of Figure 10.

Figure 12 is a perspective view of a panel similar to Figure 10 except that the clip of Figure 7 is replaced with a modified member performing certain of the functions.

Figure 13 is a sectional view on the plane 13—13 of Figure 12.

Figure 14 is a perspective view of a casing suitable for use with either the panel 10 or 12.

Figure 15 is a developed panel having horizontal members attached and to which the addition of the members of Figure 7, would produce the panel of Figure 10, the members of Figure 8, would produce the panel of Figure 16, and properly secured flat strips would produce the panel of Figure 12.

Figure 16 is a perspective view of a panel similar to Figure 10, but with the clip of Figure 8 attached thereto.

Figure 17 is a cross sectional view on the plane 17—17 of Figure 16.

Figure 18 is a perspective view of a casing suitable for use with the panel of Figure 16.

Figure 19 is a cross sectional view similar to Figure 11 except that it shows the clip of Figure 9 instead of the clip of Figure 7.

Figure 20 shows a perspective view of part of a three sided casing having a separate bottom attached by a clip similar to that of Figure 8.

Referring to Figures 1, 2, and 3; 1 is a clip of metal having the top face 2, the long leg 3, the short leg 4, and the flange or lip 5 extending inwardly from the extremity of the short leg, which is adapted to be used to secure parts of a container, of the class described, together. For instance in the form of container shown in Figure 2, the side wall extensions 6, which fold over and lie flat against the end wall extension 7 may be made narrow as shown in Figures 2 and 3, so that the lip or flange 5 on the clip 1 will engage the edge of the extension when the clip is in position on the upper edge of the side wall. The clip is secured in position by first hooking the lip 5 under the extension 6 and thereafter rotating the clip from the position shown in dotted lines, Figure 3, to that shown in full lines in said figure. It will be understood that if the parts are proportioned so that a little pressure is required to affix the clip to the material it will make a very serviceable joint.

Now referring to Figures 4 and 5, it will be seen that I illustrate a form of reinforced front edge of a casing of the class described, in which reinforcements may be formed by merely slipping channel strips over the front edge of the casing opening after it is assembled. In this case the upper and lower channel strips 9 and 10 are merely slipped over the edge of the upper and lower edges of the casing and adapted to be held by means which permit the strip to slip onto the material easily but prevents it being withdrawn therefrom. Thus it will be understood that the edge of the material may be folded over and a channel or clip, like that shown in Figure 3 may be slipped over it to secure the same by engagement between the edge of the turned in material and the lip of the channel, as disclosed in my copending application Serial Number 690,360, filed September 21, 1933.

A modification of this form of construction is shown for the vertical channels 8 acting as posts at the side of the open end of the casing. Here the cleats 11 are attached to the inside of the vertical walls 12 of the casing, and are secured thereto by adhesive or other suitable means. When the channels 8 are slipped over the edge of the casing the lip 13 of the channel will engage the cleat 11 as clearly shown in Figure 5. This engagement of the leg 13 with the cleat 11 locks the channel against withdrawal from the casing, and the face 14 of the channel abutting against the front edge of the side wall 12 prevents further inward movement of the channel which is thus securely held in position.

In Figure 6, I have shown a modified form of the same construction in which the cleat 11 is replaced by the fold 11' which may be produced by bending backward a flap extension of the side wall 12. The channel 8' which in this instance forms the vertical reinforcing member for the open end of the casing is held in place by the leg 13' engaging the edge of the fold 11' and by the face 14' abutting against the front edge of the side wall. The side wall 12 and the bent back flap extension 11' are held between the two side walls 15 and 16 of the channel member 8'.

It will be noted that in the above, the flange or lip of the metal member hooks over a fold or flap of the sheet material, and at the same time the fold or flap is held against its adjacent part in the construction, thus the clip holds the flap in place and the flap holds the clip in place. This same principle is further illustrated as follows:—

Figures 16, 17 and 18 show the rear end of a casing and an inset rear wall member for use therewith. The rear wall member is formed from the blank of Figure 15 in which 20 is a blank of sheet material having the score lines 21, 22, 23, and 24 which define the back panel 25, the top and bottom flaps 26 and the side flaps 27. A channel shaped member 28 is attached by the prongs 29 to the top and bottom flaps. The blank as shown in Figure 15 is a semi-finished blank to produce the end walls shown in Figures 10, 12, or 16. If the clips shown in Figure 8 are attached to the vertical flaps 26 of Figure 15, the blank may be folded on its score lines into the rear wall panel of Figure 16.

The clip shown in Figure 8 comprises a substantially U-shaped section with the base of the U at 30, and the legs 31 and 32. The leg 31 is provided at its open end with the flange or lip 33. The leg 32 is provided with the prongs 34 formed from the metal of the leg 32. The clip may be attached to the blank 20 by means of these prongs, and to complete the blank to form a back as shown in Figure 15, a clip as in Figure 8 is attached to each of the flaps 26 by means of the prongs 34, with the leg 32 on the near side of the flap 26 and the leg 31 on the far side of the flap 26 as viewed in Figure 15. The rear end panel of Figure 16 is then produced simply by bending the blank on its score lines.

Figure 18 shows the rear end of a casing tube suitable for receiving the rear end panel of Figure 16. It comprises the top wall 35, the bottom wall 36 and the side walls 37. Each side wall is provided with a flap 38 which folds over and lies flat on the outside of the side wall, which is notched back so that the face 39 of the flap 38 will be in the same vertical plane as the rear edge 40 of the top and bottom walls.

To attach the back panel to the tube it is necessary only to slightly spring the back legs 31 of the clips so that the edges of the flanges 33 will ride upon the outside of the flaps 38, and to then push the rear panel into the tube until the flange 33 springs back of the rear edge 41 of the flap 38. In this position which is more clearly shown in Figure 17, which is a section on the line 17—17 of Figure 16 when the rear panel has been placed into position within the tube of Figure 18, the front edge of 30 of the clip is in contact with the front edge 39 of the flap which prevents further inward motion of the end panel. At the same time the flange 33 laps over the edge 41 of the flap and the flap 38 is held against the wall 37 by the leg 31. This prevents withdrawal of the panel. Thus, as the panel is held both against inward and outward movements relative to the tube, it is effectively positioned in the tube, and this is done merely by pushing the panel into the tube, using my novel fastening means. The U-shaped members 28 on the top and bottom flap of the back panel will hook over the edges 40 of the top and bottom wall of the tube. This will give a finished appearance to the tube and at the same time will cooperate with the edge 30 of the clip and the edge 39 of the flap in preventing inward movement of the back panel.

In this adaptation of my clip, where the flaps on the casing are bent on the outside of the casing, the clip functions both to hold the flap against its adjacent panel and to latch the attached part back of the edge of the flap. By forming the flap so that it is turned inwardly into the casing, it is possible to simplify the construction of the clip which need then be called upon to perform only the latching function, as the function of holding the flap in place can be transferred to the whole back wall assembly.

Figures 12, 13, and 14 show such a simplified construction. The casing of Figure 14 has the top wall 42, the bottom 43, and the side walls 44. The side walls 44 have the flaps 45 turned inwardly into the casing tube with the portion 46 of the flap in the same vertical plane as the rear edge 47 of the top and bottom walls 42 and 43 of the casing.

The rear panel comprises the blank of Figure 15 with the metal strips 48 attached thereto by the prongs 49'. These strips are attached to the back of the panel 25 adjacent to the flaps 26 in a manner that when the flaps 26 are bent back upon their score lines, the strips 48 will project slightly beyond the edge of the panel as clearly shown in Figures 12 and 13.

To attach this rear panel to the casing, the flaps of the panel are bent on their score lines and the panel is pushed into the casing tube. The distance between the outer edges of the strips 48 is slightly less than the inside distance between the two side walls 44 but is greater than the inside distance between the bent back flaps 45. Thus while the rear panel is being inserted into the tubing the tube will be sprung back until the outstanding lip on the member 48 is pushed beyond the free edge of the flap 45, when the casing will spring back into shape with the outstanding lip of the member 48 locking into position behind the flap 45. At the same time the inside of the U clip 28 on the top and bottom flaps of the end panel will come into contact with and lap over the end faces 47 of the top and bottom wall of the cabinet, which will prevent further movement of the panel inwardly relative to the casing. It will be noted that the rear panel 25, being positioned between the ends of the flaps 45 firmly holds these flaps against the side wall of the casing. Thus with the member 48 locked behind the firmly secured flap 45 of the casing preventing outward movement of the rear panel and with the clips 28 attached to the rear panel abutting the rear edge of the casings and preventing inward movement, the panel is securely positioned relative to the casing wall.

In the modification just discussed, the exposed cut edges of the flaps 26 are not provided with a trim. A better appearance is presented if these edges are trimmed and this end may be accomplished by use of the S shaped clip 49 as shown in Figure 7 in place of the substantially flat member just discussed.

Clip 49 has the web 51 provided with the attaching prongs 50 formed therefrom. One edge of the web 51 is bent to form the flange of lip 52, and the other edge of the web 51 is bent to form the hook shaped flange 53.

Member 49 is attached to each of the flaps 26 of blank 15 to form the blank for the panel of Figure 10. In applying member 49 to the flap 26, the member 53 is hooked over the edge of the flap with the web 51 on the far side as viewed in Figure 15. The prongs 50 are driven through the flaps and are then clinched. When the blank is now bent on its score lines the back panel shown in Figure 10 is formed.

If the member 49 were so proportioned that upon folding the blank, the lip 52 came on line with the back of the casing, it will be seen that functionally the structure is similar to that shown and described in Figure 12, except that means are provided in clip 49 to trim or finish the cut edge of the flap 26; and its assembly into the casing and its operation as a locking means is the same as described in connection with Figure 12.

I prefer, however, with the form of clip shown in Figures 7, 10, and 11, that the web 51 be extended so that the flange 52 will lie some distance beyond the rear face of the panel 25; and that the flap 45 on the casing be correspondingly substantially the same length as the web 51. With the web extending some distance beyond the back of the panel as is clearly shown in Figure 11, which is a section on the line 11—11 of Figure 10, with the back panel inserted into the casing of Figure 14, elasticity is provided in the clip itself so that during the insertion of the back panel less strain is imposed on the casing than where the locking flange is flush with the rear panel and all distortion to allow the insertion of the panel is placed upon the casing.

It will be noted with the construction shown in Figures 16, 17, 18 wherein the casing flap is placed on the outside, that the clip member acted both to prevent withdrawal of the panel and to prevent further insertion of the panel beyond its normal position. Therefore, clips of this kind could be placed on the top and bottom flaps of panel 20 to replace the channel shaped hooks 28, as well as being used on the side flaps as has been explained.

With the construction shown in Figures 10, 11, 12, 13, and 14 wherein the casing flap is placed on the inside, the clip member acts only to prevent withdrawal of the panel and not to prevent insertion beyond its normal position, which function is performed by the members 28 acting with the back panel and the casing edges 47. Thus without further modification, the clips must be used in conjunction with the hooks 28, and the hook cannot be removed or replaced by the clips. However, I find that such modification can be made by changing the form of the clip so as to provide a flange abutting against the face 46 of the flap 45. Thus clip 54 of Figure 9 is a modification of clip 49 of Figure 7. This clip has the web 51a, the prongs 50a, the locking flange 52a which are the same as the corresponding members of clip 49. However the front flange 55 of clip 54 is provided with a reentrant bend forming the additional flange section 56. This flange section butts against the face 46 of the flap when the clip 54 is applied to the blank 20 of Figure 15 and the panel thus formed is inserted into the casing of Figure 14, in the same manner as has been explained in connection with clip 49 of Figure 7. This is clearly shown in Figure 19 which is similar to Figure 11 except that clip 54 is illustrated in Figure 19 and clip 49 is illustrated in Figure 11. It will be noted that flange portion 56 prevents inward movement of the panel and that flange 52 prevents outward motion, when the panel has been placed in position. Clip 54 may therefore be used on all of the flaps of blank 20, and the channel members 28 may be dispensed with if desired.

It will be noted that while I have described the various modifications of my clip fastening or securing means largely in connection with attaching a back panel into a casing tubing, I do not intend to limit my invention to the particular adaptation as it is shown by way of illustration only. It will be realized that turning the container on end so that the inserted panel is the top of the container, a similar construction may be used as a cabinet top, (the use of which may be made in conjunction with a cabinet as described in my copending application Serial No.

739,962 filed Aug. 15, 1934). Furthermore by turning the casing so that the inserted panel is on the bottom, a similar construction may be used as a cabinet, (and used with the above mentioned copending application Serial No. 739,962) as a base for a collapsible clothes hamper, ice-cream cabinet, three sided filing casing, or similar structures of fibrous sheet material. The use of the construction in a three sided filing case is thus indicated in Figure 20, in which 57, and 58 are the side walls, and 59 is the top wall of a filing case. The bottom panel 60 is shown to be attached by clips of Figure 8, and the sectional view of Figure 17 represents section 17—17 of Figure 20 in the same manner as it represents section 17—17 of Figure 16. Moreover, it can easily be seen from Figure 20 that the construction used at the bottom of the casing may be adapted for use in connection with a raised bottom filing drawer. My locking clip construction is thus generally adaptable to structures of sheet fibrous material. It may be used in conjunction with the disclosures shown in my copending applications filed coincidently with the application and entitled: Three sided casing, Serial No. 45,714.

Now having disclosed my invention so that it may be readily understood by one skilled in the art, I claim:

1. In a structure of fibrous sheet material, a panel of said material, a flap on the edge of said panel and bent parallel thereto, and a metallic clip having two substantially parallel legs placed over said panel and said folded flap whereby said flap is held against said panel, and a flange on one of said legs, said flange being sprung behind the outstanding edge of said flap and holding said clip in place.

2. A clip for fastening members of sheet fibrous material, comprising a U shaped metallic structure adapted to be sprung over an edge of said fibrous material having a turned back flap thereon, the clip being formed to hold the turned back flap in face to face contact with sheet of fibrous material, and one leg of the U being provided with a flange so shaped as to spring over the outstanding edge of said flap when the clip is placed in position and hold said clip in place.

3. In a structure of fibrous sheet material, a member having a flap turned in face to face relationship thereto, a second member having a metallic clip secured thereto, said clip having an outstanding lip sprung behind the outstanding edge of said turned back flap and holding said clip in place, and means integral with said clips for holding said flap in face to face relationship with said first named member.

4. In a structure of fibrous sheet material, a member having a flap turned in face to face relationship thereto, a second member having a metallic clip secured thereto, said clip having an outstanding lip sprung behind the outstanding edge of said turned back flap and holding said clip in place, and means integral with said clip for holding said flap in face to face relationship with said first named member.

5. In a structure of fibrous sheet material, a member having a flap turned inwardly into face to face relationship with said member, a second member having a clip attached thereto, said clip having an outstanding lip extending over the exposed edge of said turned back flap and holding said clip in place, means on said second member for holding said flap in face to face relationship with said first member, and means on said second member acting with said outstanding lip to lock said second member in a fixed position relative to said first member.

6. In a structure of fibrous sheet material, a member having a flap turned inwardly into face to face relationship with said member, a second member having a clip attached thereto, means on said second member for holding said flap in face to face relationship with said first member, said clip having an outstanding lip extending over the outstanding edge of said turned back flap, holding said clip in place, and having also a flange portion extending over the edge of said flap where it is united with said first member.

7. In a structure of fibrous sheet material, a member having a flap turned outwardly into face to face relationship with said member, a second member having a clip attached thereto, said clip having means for holding said flap in face to face relationship with said first member, other means of engaging the outstanding face of said flap, and other means for engaging the edge of said flap where it is united with said first named member.

8. In a structure of fibrous sheet material, a metal clip adapted to hold a flap of the fibrous material in face to face relationship with the portion of the material to which said flap is united, said clip having an integral lip adapted to coact with the free edge of said flap and holding said clip in place, said clip also having integral prongs adapted to secure said clip to a second portion of sheet material.

9. In a container having a straight wall, a member mounted on the edge of said wall, said member having a projection, said wall having a depression, said projection engaging said depression, elastic means in said member, whereby said member may be slipped over the edge of said wall with elastic deformation and said projection will cooperate with said depression to maintain said member in a predetermined position relative to said wall.

PHILIP ZALKIND.